United States Patent
Koivisto et al.

(10) Patent No.: US 9,491,689 B2
(45) Date of Patent: Nov. 8, 2016

(54) CELL SEARCH FOR FLEXIBLE SPECTRUM USE

(75) Inventors: Tommi Koivisto, Espoo (FI); Vinh Van Phan, Oulu (FI); Frank Frederiksen, Klarup (DK); Klaus Pedersen, Aalborg (DK)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/996,375

(22) PCT Filed: Jun. 2, 2009

(86) PCT No.: PCT/FI2009/050465
§ 371 (c)(1),
(2), (4) Date: Dec. 3, 2010

(87) PCT Pub. No.: WO2009/147296
PCT Pub. Date: Dec. 10, 2009

(65) Prior Publication Data
US 2011/0086657 A1 Apr. 14, 2011

Related U.S. Application Data

(60) Provisional application No. 61/130,786, filed on Jun. 3, 2008.

(51) Int. Cl.
*H04B 7/00* (2006.01)
*H04W 48/16* (2009.01)
(Continued)

(52) U.S. Cl.
CPC .......... *H04W 48/16* (2013.01); *H04J 11/0069* (2013.01); *H04W 88/06* (2013.01)

(58) Field of Classification Search
None
See application file for complete search history.

(56) References Cited

U.S. PATENT DOCUMENTS 5,784,368 A 7/1998 Weigand et al.
7,027,827 B2 4/2006 Bonta et al.
(Continued)

FOREIGN PATENT DOCUMENTS

CN 1540896 A 10/2004
CN 1797992 A 7/2006
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.3.0, Dec. 2007, 121 pgs.
(Continued)

*Primary Examiner* — Mohammed Rachedine
(74) *Attorney, Agent, or Firm* — Harrington & Smith (57) ABSTRACT

Structure of a multi-carrier flexible spectrum wireless cell is determined from received synchronization or broadcast channels of detected individual carriers. The determined structure is used to select an intended carrier for initial access or cell reselection to the flexible spectrum wireless cell. The structure may have carriers compatible with an earlier version (LTE/Release 8) of a communication standard and with a later version (LTE-A/Release 9). The received synchronization channels can inform of: relative positions of the individual carriers in a spectrum band of the multi-carrier structure; relative timing alignments of the received synchronization channels; contents of the received synchronization channels; and/or layer 1 cell-carrier identifiers. The synchronization channels may have a different structure as between the earlier and later versions, and the different structure is used to select the carrier that is compatible with the user equipment making the selection.

15 Claims, 3 Drawing Sheets

(51) Int. Cl.
*H04J 11/00* (2006.01)
*H04W 88/06* (2009.01)

(56) References Cited

U.S. PATENT DOCUMENTS

| | | | | |
|---|---|---|---|---|
| 7,593,449 | B2* | 9/2009 | Shattil | H04B 1/707 375/130 |
| 7,876,786 | B2 | 1/2011 | Bahl et al. | |
| 8,018,879 | B2* | 9/2011 | Li | H04B 7/2618 370/280 |
| 8,305,894 | B1 | 11/2012 | Zang et al. | |
| 2004/0176039 | A1 | 9/2004 | Leyh et al. | |
| 2006/0068715 | A1 | 3/2006 | Hundal et al. | |
| 2007/0002898 | A1* | 1/2007 | Boariu | H04L 5/0007 370/468 |
| 2007/0224988 | A1 | 9/2007 | Shaheen | |
| 2007/0280161 | A1 | 12/2007 | Rudrapatna et al. | |
| 2008/0056183 | A1 | 3/2008 | Gorokhov et al. | |
| 2008/0062933 | A1 | 3/2008 | Liu et al. | |
| 2008/0253336 | A1* | 10/2008 | Parkvall | H04W 24/10 370/335 |
| 2008/0261551 | A1* | 10/2008 | Catreux-Erceg | H04B 7/0615 455/272 |
| 2008/0311852 | A1* | 12/2008 | Hansen et al. | 455/41.2 |
| 2009/0010213 | A1 | 1/2009 | Yamada et al. | |
| 2009/0196180 | A1 | 8/2009 | Bahl et al. | |
| 2009/0219910 | A1* | 9/2009 | Han | H04L 27/2614 370/343 |
| 2009/0258647 | A1 | 10/2009 | Yamada et al. | |
| 2010/0093363 | A1 | 4/2010 | Malladi | |
| 2010/0157970 | A1 | 6/2010 | Gotman et al. | |
| 2011/0032892 | A1 | 2/2011 | Bahl et al. | |
| 2011/0092200 | A1 | 4/2011 | Charbit et al. | |
| 2011/0128865 | A1 | 6/2011 | Doppler et al. | |
| 2011/0216731 | A1* | 9/2011 | Frederiksen et al. | 370/329 |
| 2011/0218731 | A1* | 9/2011 | Ando | G01C 21/20 701/408 |

FOREIGN PATENT DOCUMENTS

| | | | | |
|---|---|---|---|---|
| EP | 1892865 | A1 * | 2/2008 | |
| EP | 1892895 | A1 * | 2/2008 | H04W 76/068 |
| EP | 1906686 | A1 | 4/2008 | |
| EP | 1998482 | A2 | 12/2008 | |
| WO | 2007111186 | A1 | 10/2007 | |
| WO | 2007136306 | A1 | 11/2007 | |
| WO | WO 2008111807 | A2 * | 9/2008 | H04B 7/12 |

OTHER PUBLICATIONS

"Proposals for LTE-Advanced Technologies", NTT DoCoMo, Inc., 3GPP TSG RAN WG1 Meeting #53, R1-081948, May 2008, 29 pgs.

"Proposed SID on LTE-Advanced", NTT DoCoMo, 3GPP TSG RAN #39, RP-080137, Mar. 2008, 5 pgs.

"Solution(s) to the 36.902's Automated Configuration of Physical Cell Identity Use Case", Nokia Siemens Networks, 3GPP TSG-RAN Meeting #59-bis, R3-080812, Mar.-Apr. 2008, 7 pgs.

International Search Report and Written Opinion of the International Searching Authority for PCT Application No. PCT/FI2009/050465, dated Sep. 24, 2009, 11 pages.

NTT DoCoMo Inc., "Proposals for LTE-Advanced Technologies", 3GPP TSG RAN WG1 Meeting #53, Kansas City, USA, May 5-9, 2008, R081948.

Tsai et al., "Cell Search in 3GPP Long Term Evolution Systems", IEEE Vehicular Technology Magazine, vol. 2, No. 2, Jun. 2007, pp. 23-29.

3GPP TR 36.913 V0.0.6; "3rd Generation Partnership Project; Technical Specification Group Radio Access Network; Requirements for Further Advancements for E-UTRA (LTE-Advanced) (Release X)"; May 2008; whole document (16 pages).

Ericsson; "A Discussion on Some Technology Components for LTE-Advanced", R1-082024; 3GPP TSG-RAN WG1 #53, May 5-9, 2008, Kansas City, MO, USA; Section 2.1 & 2.1.2.

Akyildiz et al.; "Next Generation/Dynamic Spectrum Access/Cognitive Radio Wireless Networks: A Survey"; Computer Networks, vol. 50, Issue 13, Sep. 15, 2006; pp. 2127-2159.

3GPP TR 25.814 V7.1.0; "3rd Generation Partnership Project; Technical Specification Group Radio Access Network; physical layer aspects for evolved Universal Terrestrial Radio Access (UTRA) (Release 7)", Sep. 2006; pp. 37, Section 7.1.2.4.1; pp. 40, Section 7.1.2.4.3.

Nokia Siemens Networks; "Autonomous Component Carrier Selection for LTE-Advanced"; R1-083103; 3GPP TSG-RAN WG1 #54, Aug. 18-22, 2008, Jeju Island, Korea; whole document (4 pages).

Nokia Siemens Networks; "Algorithms and Results for Autonomous Component Carrier Selection for LTE-Advanced"; R1-083733; 3GPP TSG-RAN WG1 #54bis, Sep. 29-Oct. 3, 2008, Prague, Czech Republic; whole document (5 pages).

NTT DOCOMO; "Proposed SID on LTE-Advanced"; RP-080137; 3GPP RAN #39, Mar. 4-7, 2008, Puerto Vallarta, Mexico; whole document (5 pages).

NSN et al.; "Solution(s) to the 36.902's Automated Configuration of Physical Cell Identity Use Case"; R3-080812; 3GPP TSG-RAN WG3 Meeting #59bis, Apr. 2008, Shenzen, China; whole document (7 pages).

* cited by examiner

CELL SEARCH FOR FLEXIBLE SPECTRUM USE

RELATED APPLICATION

This application was originally filed as PCT Application No. PCT/FI2009/050465 on Jun. 2, 2009 and claims priority to U.S. Provisional Application No. 61/130,786 on Jun. 3, 2008, which is incorporated herein by reference in its entirety.

TECHNICAL FIELD

The exemplary and non-limiting embodiments of this invention relate generally to wireless communication systems, methods, devices and computer programs and, more specifically, relate to cell search and selection techniques for use in a multi-carrier cellular communication system.

BACKGROUND

Various abbreviations that may appear in the specification and/or in the drawing figures are defined as follows:
3GPP third generation partnership project
BCH broadcast channel
BW bandwidth
CIR carrier per interference ratio
DL downlink (eNB towards UE)
eNB EUTRAN Node B (evolved Node B)
EUTRAN evolved UTRAN (LTE)
FSU flexible spectrum use
HO handover
ID identification
IMT international mobile telecommunications
IMT-A advanced IMT
L1 Layer 1 or physical (PHY) layer
LA local area
LTE long term evolution
LTE-A LTE advanced
MME mobility management entity
Node B base station
OFDMA orthogonal frequency division multiple access
PHY physical
RAN radio access network
Rel. release
RSP redirecting synchronization pointer
RSSI carrier received signal strength indicator
SC-FDMA single carrier, frequency division multiple access
S-GW serving gateway
SID system identification
TDD time division duplex
UE user equipment
UL uplink (UE towards eNB)
UTRAN universal terrestrial radio access network
WG working group A proposed communication system known as evolved UTRAN (E-UTRAN, also referred to as UTRAN-LTE or as E-UTRA) is currently under development within the 3GPP. As currently specified the DL access technique will be OFDMA, and the UL access technique will be SC-FDMA.

One specification of interest is 3GPP TS 36.300, V8.3.0 (2007-12), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8), which is incorporated by reference herein in its entirety. This system may be referred to for convenience as LTE Rel-8, or simply as Rel-8, and may also be referred to herein as being an earlier version of a communication standard.

Of particular interest herein is the 3GPP LTE Release 9 (and beyond towards future IMT-A systems), referred to herein for convenience simply as Rel-9, or as LTE-Advanced (LTE-A), and may also be referred to herein as being a later version of a communication standard. Of additional interest herein are LA deployment scenarios using TDD in a scalable bandwidth (of up to, for example, 100 MHz) with flexible spectrum use (FSU). This system concept may be referred to herein for convenience as Rel-9 LA.

It has been decided that LTE Rel-8 UEs should be able to operate in the LTE-A system. General reference in this regard may be made to 3GPP TSG RAN WG1 Meeting #53, Kansas City, USA, May 5-9, 2008, R1-081948, Proposals for LTE-Advanced Technologies, NTT DoCoMo, Inc, which was attached as Exhibit A to the priority document U.S. 61/130,786 (filed on Jun. 3, 2008).

In evolving towards Rel-9, maintaining backwards compatibility with Rel-8 (E-UTRAN) is an important issue. For example, a Rel-8 UE should be able to access a corresponding Rel-9 system, and a Rel-9 UE should be able to access corresponding Rel-8 system. Provided that a Rel-8 UE is capable of operating in a scalable system bandwidth of up to 20 MHz (e.g., 10 MHz TDD or 20 MHz TDD) as specified in 3GPP, and that this BW is then scaled up to 100 MHz for Rel-9, the Rel-9 radio may possibly be structured as a scalable multi-carrier system having at least one Rel-8-compatible carrier.

As can be appreciated, a number of problems can arise in attempting to maintain compatibility between Rel-8 and Rel-9 systems.

Other publications that may be interest herein include RP-080137, Proposed SID on LTE-Advanced, NTT DoCoMo, 3GPP RAN#39, Puerto Vallarta, Mexico, 4-7 Mar. 2008, attached as Exhibit B to the priority document, and R3-080812, Solution(s) to the 36.902's Automated Configuration of Physical Cell Identity Use Case, Nokia Siemens Networks, Nokia, Shenzen, China, April 2008, attached as Exhibit C to the priority document.

SUMMARY

Various aspects of examples of the invention are set out in the claims.

According to a first aspect of the present invention, there is a method which comprises: determining a multi-carrier structure of a flexible spectrum wireless cell based on received synchronization or broadcast channels of detected individual carriers of the wireless cell; and using the determined multi-carrier structure to select an intended carrier for initial access or cell reselection to the flexible spectrum wireless cell. In an embodiment, this method may be executed by a processor of a user equipment.

According to a second aspect of the present invention, there is a memory storing a computer readable program that when executed by a processor results in actions. In this aspect the actions comprise: determining a multi-carrier structure of a flexible spectrum wireless cell based on received synchronization or broadcast channels of detected individual carriers of the wireless cell; and using the determined multi-carrier structure to select an intended carrier for initial access or cell reselection to the flexible spectrum wireless cell.

According to a third aspect of the present invention, there is an apparatus that comprises a processor and a transmitter. The processor is configured to determine a multi-carrier structure of a flexible spectrum wireless cell based on received synchronization or broadcast channels of detected individual carriers of the wireless cell, and to use the determined multi-carrier structure to select an intended carrier. The transmitter is configured to attempt initial access or cell reselection to the flexible spectrum wireless cell on the selected carrier. In an embodiment, there is instead processing means and sending means, of which exemplary implementations are a processor and transmitter, respectively.

DETAILED DESCRIPTION

Before discussing in detail the exemplary embodiments of this invention, it will be useful to describe in further detail various problems anticipated by the inventors that may arise in possible Rel-8/Rel-9system and spectrum deployments.

Figure 1A:
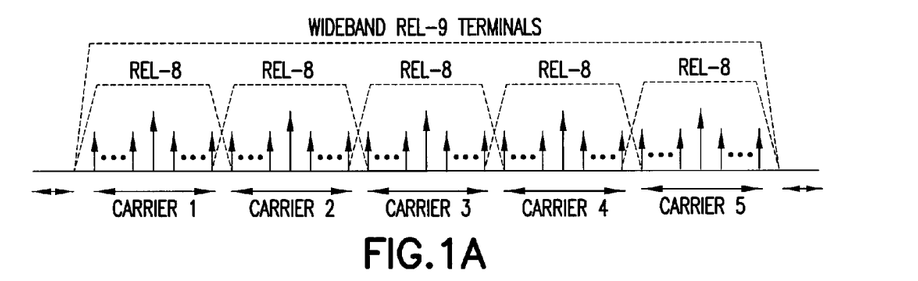
FIGS. 1A-1C show various scalable multi-carrier alternatives for Rel-9 radios.
Figure 1B:
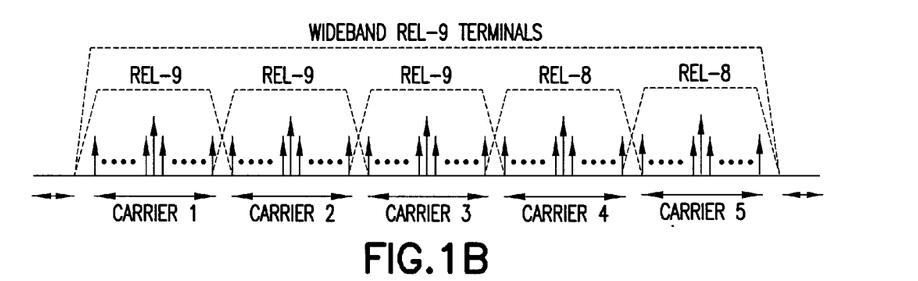
Figure 1C:
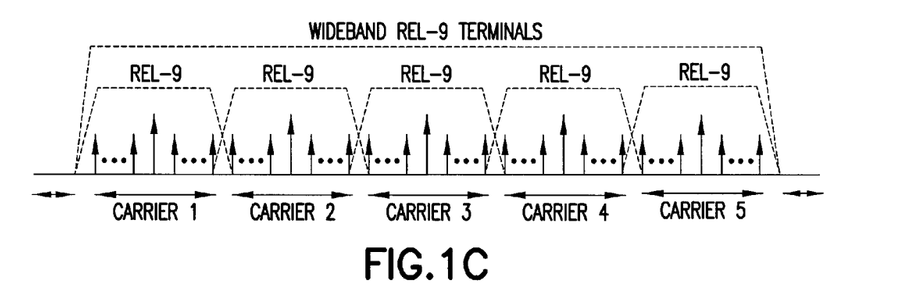

FIGS. 1A-1C illustrate several possible alternative examples of multi-carrier structuring for Rel-9.

FIG. 1A shows one example wherein the wideband Rel-9 spectrum is made up of virtually independent multiple Rel-8 compatible carriers. FIG. 1B shows that the wideband Rel-9 spectrum is made up of one or several Rel-8 compatible carrier(s) and one or several Rel-9 specific carrier(s). FIG. 1C shows a case where the wideband Rel-9 spectrum is scalable, but not backward compatible with Rel-8 (all carriers are Rel-9 carriers).

In these examples a Rel-9 cell is assumed to use at least two carriers, each having a bandwidth of 20 MHz as in Rel-8. The disruptive alternative shown in FIG. 1C is not intended for a Rel-8 UE but for a Rel-9 UE, keeping in mind that a Rel-9 UE is able to access a Rel-8 system.

Note that FIGS. 1A-1C illustrate a concept that may be referred to as channel bonding of contiguous channels, in which five carriers or chunks of 20 MHz spectrum are bonded in a channel bandwidth of 100 MHz. However, Rel-9 may also use a non-contiguous option as well, in which the overall Rel-9 channel bandwidth (scaled up to 100 MHz) results from a channel aggregation of at least one Rel-8 compatible carrier (Rel-8 carrier for short) and a Rel-9 compatible carrier (Rel-9 carrier for short) that is well separated in the frequency band from that of the Rel-8 carrier.

A particular problem that arises in the proposed Rel-9 multi-carrier system relates to UE cell search and selection. More specifically, as the UE employs passive radio scanning for initial cell search and selection and, eventually, cell reselection and inter-cell measurement in support of, for example handover (HO), a considerable amount of time and resources can be expended to search through multiple carriers. Furthermore, one should also take into consideration possible design enhancements and optimizations for Rel-9 in terms of protocol overhead and FSU. Note that the concept of FSU allows for multiple operators to share the same carrier spectrum in the same LA for Rel-9 system deployment.

In currently specified Rel-8 cell search and selection the UE acquires time and frequency synchronization with a cell, detects the L1 cell ID of that cell, and then decodes the BCH based on information indicated in hierarchical synchronization channel signals. The L1 cell ID, obtained from a DL synchronization channel, is at least one essential cell configuration parameter. The current Rel-8 structure may be maintained and applied to each carrier in Rel-9, or it may be modified and enhanced for use with Rel-9 specific carriers. The use of the former option may cause some confusion for a Rel-8 UE if the carrier that the Rel-8 UE first finds and locks onto is in fact a Rel-9 specific carrier. In addition, the use of the latter option may force a Rel-9 UE to perform both Rel-8 and Rel-9 cell search procedures to find a carrier. This may be the case since the Rel-9 UE may not know whether a Rel-8 or a Rel-9 system is operating in the LA environment.

This problem may be partially addressed by using a predefined placement of Rel-8 and Rel-9 specific carriers in the Rel-9 system. For example, Rel-8 carrier(s) may be placed starting from the right-hand side of the allocated spectrum (higher frequencies) of the wideband Rel-9 template, while Rel-9 carrier(s) may be placed starting from the left-hand side of the allocated spectrum (lower frequencies). However, this fixed arrangement of carrier positions may not be sufficiently robust when considering inter-cell and co-channel interference problems that may arise when multiple operators are allowed to deploy their networks in the same LA, and use the same spectrum for FSU.

Further in this regard, the flexible placement of Rel-8 carrier(s) on a cell basis may be preferable for Rel-9 with FSU. In the aforementioned case in which Rel-9 carriers have the same DL synchronization channel structure as that of Rel-8 carriers, the L1 cell ID addressing can be used to aid the UE in determining whether a detected carrier is a Rel-8 or a Rel-9 carrier without the need to also decode the BCH. This can be based on, for example, a predefined division of the L1 cell ID addressing space between Rel-8 and Rel-9 carriers. However, this approach may also not be sufficiently robust, considering the current limited L1 cell ID addressing space of Rel-8.

In addition, the radio channel structure of each carrier, as well as the coordination between carriers for common control and dedicated transmissions in the Rel-9 system, should be taken into account. For example, the overhead of common control signaling may be unnecessarily high if the same content is sent in each and every carrier just to attempt to provide simplicity (in addition to considerations of the potential inter-cell and co-channel interference problems that may arise when supporting FSU and plug-and-play eNBs). The load balancing among the carriers is another important consideration.

The exemplary embodiments of this invention address the foregoing problems. The exemplary embodiments of this invention are not limited to using different synchronization signals for distinguishing the carriers. The use of these exemplary embodiments also provides a mechanism to determine the entire carrier structure during initial synchronization of the UE, considering that multiple Rel-8 carriers may be present.

The exemplary embodiments of this invention apply to both the contiguous channel bonding and the non-contiguous channel aggregation concepts that were discussed above.

Figure 2:
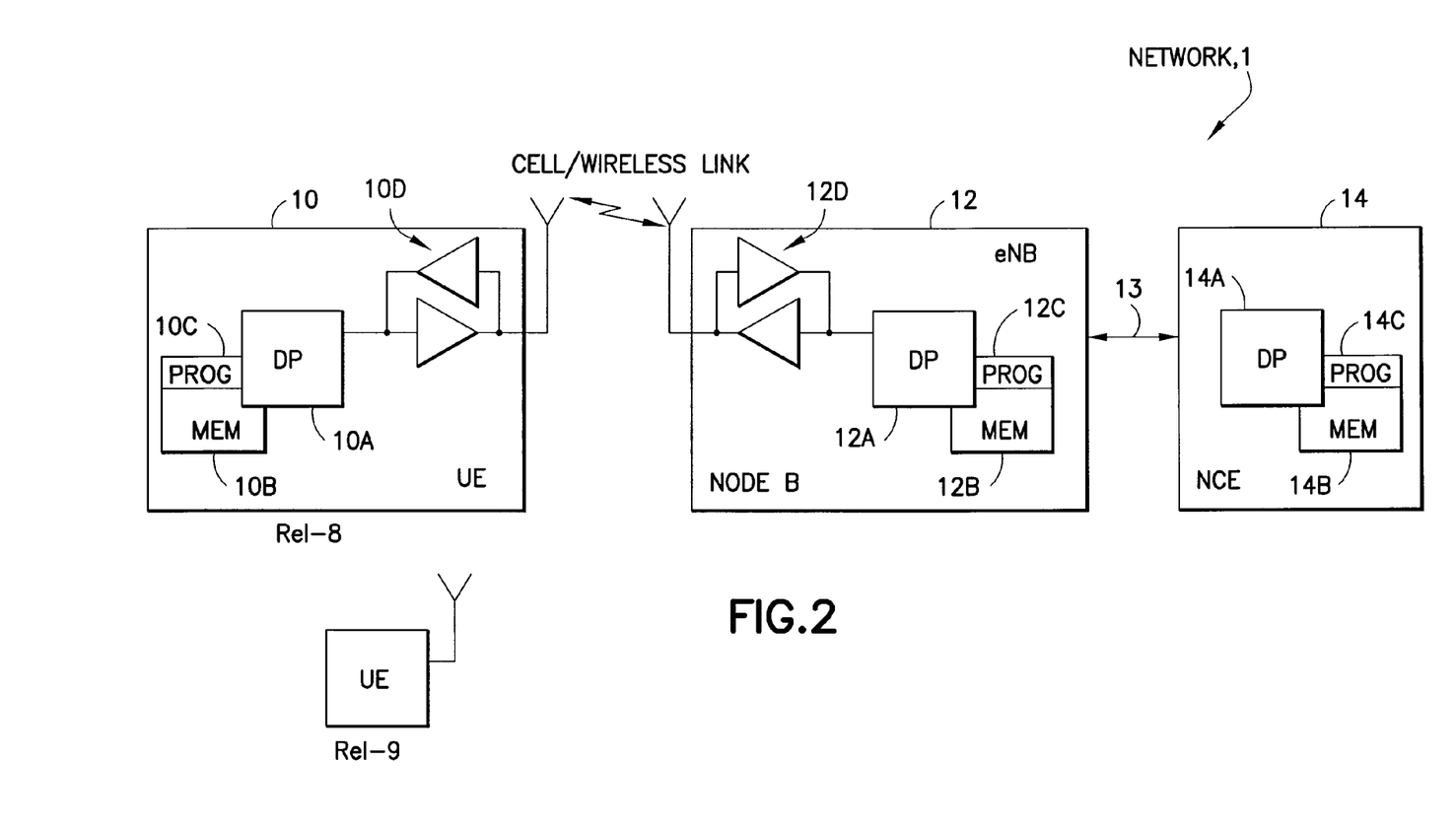
FIG. 2 is a simplified block diagram of various apparatus that can be used to implement the exemplary embodiments of this invention.

Reference is made to FIG. 2 for illustrating a simplified block diagram of various electronic devices that are suitable for use in practicing the exemplary embodiments of this invention. In FIG. 2 a wireless network 1 is adapted for communication with an apparatus 10, also referred to herein for convenience as a UE 10, via another apparatus, such as a network access node 12, also referred to herein for convenience as a Node B (base station) and more specifically an eNB 12. The network 1 may include a network control element (NCE) 14 that may include MME/S-GW functionality. However, the exemplary embodiments may also be used in an uncoordinated network environment, where the NCE 14 may be dispensed with. The UE 10 includes a data processor (DP) 10A, a memory (MEM) 10B that stores a program (PROG) 10C, and a suitable radio frequency (RF) transceiver 10D for bidirectional wireless communications with the eNB 12, which also includes a DP 12A, a MEM 12B that stores a PROG 12C, and a suitable RF transceiver 12D. The eNB 12 is coupled via a data path 13 to the NCE 14, which may be implemented as an S1 interface, which also includes a DP 14A and a MEM 14B storing an associated PROG 14C. At least one of the PROGs 10C and 12C is assumed to include program instructions that, when executed by the associated DP, enable the electronic device to operate in accordance with the exemplary embodiments of this invention, as will be discussed below in greater detail.

That is, the exemplary embodiments of this invention may be implemented at least in part by computer software executable by the DP 10A of the UE 10 and by the DP 12A of the eNB 12, or by hardware, or by a combination of software and hardware.

Typically there will be a plurality of UEs 10 serviced by the eNB 12. The UEs 10 may or may not be identically constructed, but in general are all assumed to be electrically and logically compatible with the relevant network protocols and standards needed for operation in the wireless network 1. In this case there may be at least one Rel-8 UE 10, and at least one Rel-9 UE 10.

The various embodiments of the UE 10 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, flash memory, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multicore processor architecture, as non-limiting examples.

The exemplary embodiments of this invention address and solve that various problems discussed above, and provide a simple and effective method to facilitate the optimization of cell search and selection in a backwards compatible, scalable multi-carrier cellular system with flexible spectrum use.

In order to describe these exemplary embodiments two use cases can be used, designated C1 and C2.

(C1) is a case in which the downlink synchronization channel structure of Rel-8 is reused as such across all the carriers of a Rel-9 cell, regardless of whether a given carrier of the cell is a Rel-8 or a Rel-9 carrier. This case may result in some confusion for the UE 10, as discussed above.

(C2) is a case in which a new downlink synchronization channel structure, different from that of Rel-8, is used for the Rel-9 carriers of a Rel-9 cell (thereby eliminating the aforementioned confusion problem).

Further, A# designates an alternative approach (numbered by #) and G# designates a general approach (numbered by #).

Note that to reduce the protocol overhead and to avoid the inter-cell and co-channel interference problems in Rel-9 FSU, certain common and control channels may best be operated in certain carrier(s), referred to for convenience as intended carrier(s), and omitted from the other of carriers of a Rel-9 cell. The UE 10 upon initial cell search, selection and reselection (to access a Rel-9 cell) needs to find and lock onto a suitable intended carrier.

Discussed now are the various approaches in accordance with these exemplary embodiments are various general approaches and alternatives thereof.

(G1): The UE 10 of at least Rel-9 (and other capable radio devices such as an advanced sensing local area NB) is able to determine the multi-carrier structure of a Rel-9 cell via herein introduced implicit/explicit control or coordination thereof in order to determine which carrier of the cell is the intended carrier for the UE 10 to select upon accessing the cell. This is based on the received synchronization channels of detected individual carriers: their relative positions in the allocated spectrum band(s); relative timing alignments; contents of received signals or L1 cell carrier IDs; and further predefined relations or coordination thereof. These predefined relations can be explicit or implicit.

The Rel-9 UE 10 is therefore able to recognize the carrier structure of a Rel-8 cell when it operates in a Rel-8 system. The Rel-8 UE 10 does not necessarily have to be able to recognize the carrier structure of a Rel-9 cell.

(A1): The relative positioning or placement order of the carriers of a given Rel-9 cell, in terms of where and how to place Rel-8 and Rel-9 carriers relative to one another in the allocated radio spectrum band(s), is predefined so that a Rel-8 UE 10 and a Rel-9 UE 10 is able to detect and lock onto a suitable intended carrier for accessing the cell (at least to read a broadcast channel therein) in an optimal fashion. For example, and considering (C1), an alternative option is to have Rel-9 carrier(s) placed outside the radio spectrum band(s) allocated to Rel-8 systems so that the Rel-8 UE 10 cannot receive (may not have any knowledge of) the Rel-9 carrier(s). This particular approach does not require any change to Rel-8 systems and thus is fully Rel-8 UE backwards compatible. Still considering (C1), another alternative option (which may be used as a further resolution for the previous alternative as well) is to have a Rel-8 carrier, intended for the Rel-8 UE 10 to select upon initial cell search and selection, placed at a predefined relative position that is known by the Rel-8 UE 10 (and also by the Rel-9 UE 10) so that Rel-8 UE 10 is able to select that carrier for accessing the cell. For example, a given Rel-8 carrier is placed at the most right-hand side of the allocated radio spectrum band as shown in FIG. 1B. This arrangement requires a relatively minor, not architectural, change to Rel-8 systems, and can be applied as well for a Rel-9 UE 10 to locate an intended Rel-9 carrier.

Considering now (C2), the previous option can be applied to position an intended Rel-8 carrier and/or an intended Rel-9 carrier.

Assuming the facts of (G1), and regardless of whether (C1) or (C2) is selected for use, the UE 10 determines and makes necessary decisions on selecting an intended carrier based on the relative positions or orders of at least two expected and detectable carriers of the given cells (referred to as source carriers) that conform to a certain specified and predefined relationship between them. The intended carrier does not necessarily have to be one of the source carriers.

(A2): In this second alternative approach under G1, L1 cell-carrier IDs, assigned to and detectable from the received downlink synchronization channels of individual carriers of a Rel-9 cell, are addressed so that the detected L1 cell-carrier IDs and/or relations between them implicitly indicate whether a detected carrier is the intended carrier for given UE 10. Based on this information the UE 10, during initial cell search and selection, can select the correct carrier for accessing the cell.

Considering (C1), an alternative option is to have a predefined division of L1 cell-carrier ID addressing space between Rel-8 and Rel-9 carriers. Then, further division of Rel-8 and Rel-9 sub-spaces can be applied to indicate whether a given carrier is an intended carrier. This type of division would imply that a small change be made to Rel-8 systems.

Considering (C2), the above described further division within L1cell-carrier ID addressing spaces of Rel-8 and Rel-9 can be applied.

Assuming (G1), and regardless of whether (C1) or (C2) is used, that is, where more than one carrier is detected of a given Rel-9 cell, a predefined relation or coordination between at least two of the expected and detectable L1 cell-carrier IDs, either among Rel-8 carriers or among Rel-9 carriers or among a mixture of Rel-8 and Rel-9 carriers, can be applied to indicate to the UE 10 the intended carrier to be used for Rel-8 or Rel-9. For example, the L1 cell-carrier ID of the intended Rel-9 carrier can be determined from the detected L1 cell-carrier ID(s) of Rel-8 carrier(s).

(A3): In this third alternative approach under G1, each carrier which is configured to send a broadcast channel broadcasts certain common cell-specific information, including an information element (IE) for explicitly or implicitly advertising the carrier structure of the cell. This broadcast IE may also indicate suitable carrier(s) for either a Rel-8 UE 10 or a Rel-9 UE 10 to select for accessing the cell during initial cell search and selection, as well as for cell reselection. This IE, which is new to Rel-8, does not require any change in the basic structure of Rel-8 systems. This redirection, i.e., providing UE 10 with the most suitable carrier for accessing the cell, can be determined taking into account the configured features of individual carriers and load balancing aspects for supporting FSU, resulting in a content update of the new IE. This new IE may thus be referred to for convenience as a redirecting synchronization pointer (RSP). Depending on, for example, the maximum number of carriers that can be configured for a Rel-9 cell, and how the identity of a carrier in a cell is defined (for example, using a predefined ordering index of the carriers based on position in the allocated spectrum as shown in FIG. 1, possibly combined with other information such as an indication of Rel-8 or Rel-9, L1 cell-carrier ID, and so forth), the RSP can be realized by using just several bits or several octets. In a case where the RSP format is suitably compact it may be sent even in a master information block.

(G2): The UE 10 of at least Rel-9 (and other capable radio devices such as the advanced sensing local area NB) can be configured to make a predictive or re-directive decision on initial cell search and selection, as well as on cell reselection, based on received downlink synchronization channel(s) and/or broadcast channel(s) of one or more detected Rel-8 carrier(s) and/or Rel-9 carrier(s) by following the above-described alternative proposals.

The UE 10 does not have to detect all of the carriers before making an initial cell selection decision (at least on which carrier it should select and lock onto for reading the broadcast channel and accessing the cell).

This also includes the option that the Rel-9 UE 10 makes the initial cell selection decision based upon received downlink synchronization channel(s) of Rel-8 carrier(s), but then lock onto a suitable intended Rel-9 carrier to read the broadcast channel and access the cell. This procedure is of course conditioned on the Rel-9 UE 10 obtaining adequate received CIR(s) or RSSI(s) on the selected Rel-9 carrier; otherwise it may instead lock onto a detected Rel-8 carrier. Note that in Rel-9 FSU, a particular detected Rel-9 carrier (its allocated spectrum band) may not indicate much about owner operator.

Note that further combining some of the above alternative options is also possible. The above proposals enable predictive or re-directive initial cell search and selection, as well as cell re-selection for Rel-9 systems and, therefore, reduce the time needed to gain system access.

Based on the foregoing it should be apparent that the exemplary embodiments of this invention provide a method, apparatus and computer program product(s) to enable cell search and selection in a backwards compatible, scalable multi-carrier cellular system with flexible spectrum use.

Figure 3:
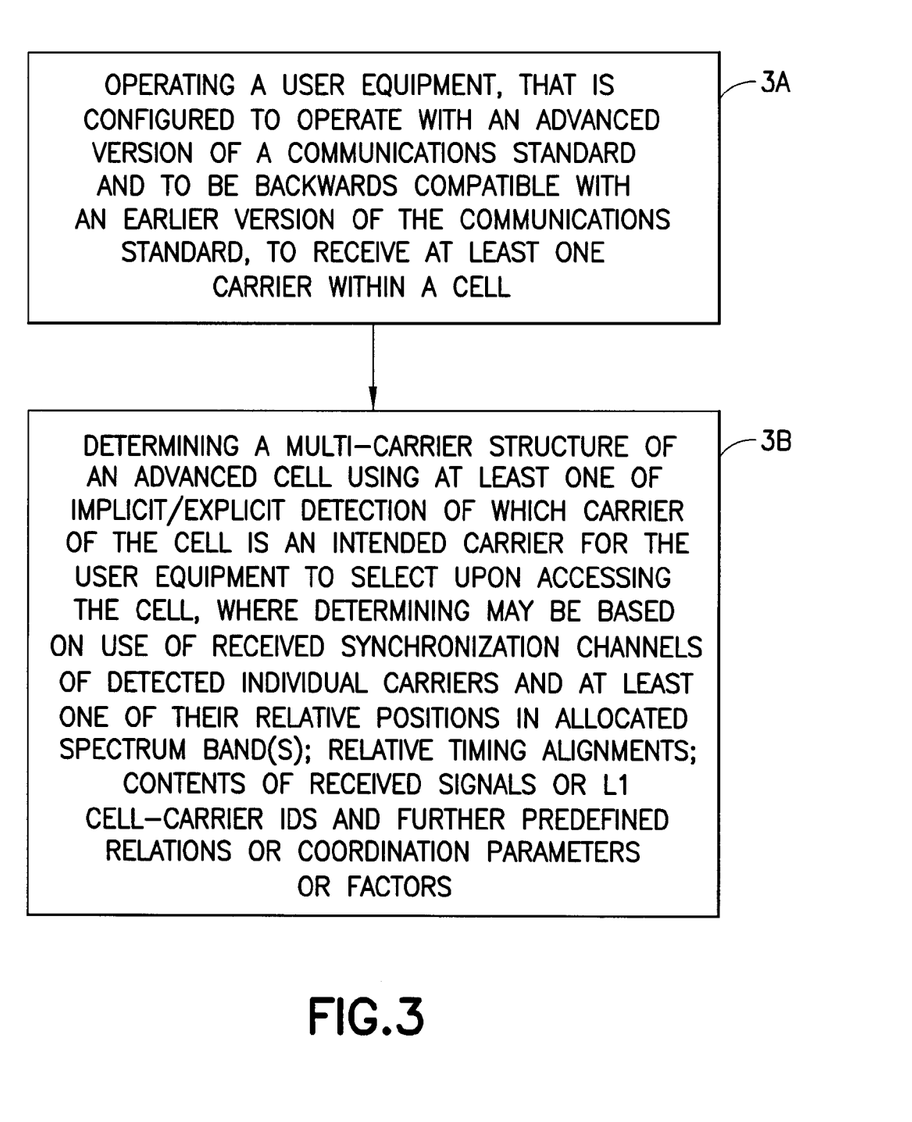
FIG. 3 is a logic flow diagram that illustrates the operation of a method, and a result of execution of computer program instructions, in accordance with the exemplary embodiments of this invention.

FIG. 3 is a logic flow diagram that illustrates the operation of a method, and a result of execution of computer program instructions, in accordance with exemplary embodiments of this invention.

(A) At Block 3A there is a step of operating a user equipment, that is configured to operate with an advanced version of a communications standard and to be backwards compatible with an earlier version of the communications standard, to receive carriers within a cell, and at Block 3B there is a step of determining a multi-carrier structure of an advanced cell using at least one of implicit/explicit detection of which carrier of the cell is an intended carrier for the user equipment to select upon accessing the cell. The step of Block 3B may be based on use of received synchronization channels of detected individual carriers and at least one of their relative positions in allocated spectrum band(s); relative timing alignments; contents of received signals or L1 cell-carrier IDs and further predefined relations or coordination parameters or factors.

(B) In the method, apparatus and computer program of the preceding paragraph, where a relative placement order of the carriers of a given cell compatible with the later version of the communication standard, relative to at least one carrier compatible with the earlier version of the communication standard, is predefined.

(C) In the method, apparatus and computer program of the preceding paragraph, where the at least one carrier compatible with the earlier version of the communication standard is placed at a predetermined location relative to other carriers in the cell, and where the predetermined location is known to user equipment compatible with the earlier version of the communication standard and also user equipment compatible as well with the later version of the communication standard.

(D) In the method, apparatus and computer program of the preceding paragraphs, where at least one carrier compatible with the later version of the communication standard is placed outside of a frequency spectrum used by user equipment compatible with the earlier version of the communication standard.

(E) In the method, apparatus and computer program of the preceding paragraphs, where a user equipment operates to select an intended carrier based on the relative position or order of at least two source carriers that conform to a predefined relationship between the source carriers.

(F) In the method, apparatus and computer program of paragraph (A), where L1 cell-carrier IDs that are assigned to and detectable from received downlink synchronization channels of individual carriers compatible with the later version of the communication standard are provided such that the detected L1 cell-carrier IDs and/or relations between them implicitly indicate whether a detected carrier is the intended carrier for the user equipment.

(G) In the method, apparatus and computer program of the preceding paragraph, where there is a predetermined division of L1 cell-carrier ID addressing space between carriers compatible with the later version of the communication standard and carriers compatible with the earlier version of the communication standard.

(H) In the method, apparatus and computer program of the preceding paragraph, where more than one carrier is detectable that is compatible with the later version of the communication standard, and where a predefined relationship exists between at least two L1 cell-carrier IDs among carriers compatible with the later version of the communication standard, carriers compatible with the earlier version of the communication standard, or carriers compatible with both the later and the earlier version of the communication standard to indicate to the user equipment the intended carrier.

(I) In the method, apparatus and computer program of paragraph (A), where those carriers configured to provide a broadcast channel broadcast certain common cell-specific information, including a redirection synchronization pointer information element for explicitly or implicitly advertising the carrier structure of the cell.

(J) In the method, apparatus and computer program of the preceding paragraph, where the information element further indicates at least one suitable carrier for the user equipment to select for accessing the cell during at least initial cell search selection and re-selection.

(K) In the method, apparatus and computer program of the preceding paragraphs, where at least a user equipment compatible with the later version of the communication standard makes a predictive or re-directive decision on at least initial cell search, selection and re-selection based on at least one of at least one downlink synchronization channel and/or broadcast channel of at least one of a detected carrier compatible with the later version of the communication standard or with the earlier version of the communication standard.

(L) In the method, apparatus and computer program of the preceding paragraph, where the user equipment is compatible with the later version of the communication standard, and makes an initial cell selection decision based upon at least one received downlink synchronization channel of a carrier compatible with the earlier version of the communication standard to access a broadcast channel from a carrier compatible with the later version of the communication standard.

The various blocks shown in FIG. 3 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed the resultant design, in a standardized electronic format, may be fabricated as one or more integrated circuit devices.

It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the EUTRAN (UTRAN-LTE, or Rel-8) system and the LTE-Advanced (Rel-9) system, it should be appreciated that the exemplary embodiments of this invention are not limited for use with only these particular types of wireless communication systems, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:

1. A method, comprising:
   determining at a user equipment a multi-carrier structure of a flexible spectrum use wireless cell based on received at least one of synchronization channels and broadcast channels of detected individual carriers of the flexible spectrum use wireless cell, where the multi-carrier structure of the flexible spectrum use wireless cell is characterized by a wide bandwidth spectrum comprised of a plurality of substantially independent individual carriers that are one of contiguous to one another in a channel bonded instance of the wide bandwidth spectrum and at least partially non-contiguous to one another in a channel aggregated instance of the wide bandwidth spectrum; and
   using the determined multi-carrier structure to select at the user equipment an intended carrier for at least one of initial access and cell reselection to the flexible spectrum use wireless cell, wherein the multi-carrier structure comprises carriers that are compatible with an earlier version of a communication standard, or carriers that are compatible with a later version of the communication standard, or carriers that are compatible with an earlier version of a communication standard and carriers that are compatible with a later version of the communication standard.
   wherein the determining comprises determining from the received at least one of synchronization channels and broadcast channels relative positions of the individual carriers in a spectrum band of the multi-carrier structure; and
   layer one cell-carrier identifiers.

2. The method according to claim 1, wherein the multi-carrier structure comprises a predefined placement of individual carriers compatible with the earlier version of a communication standard relative to individual carriers compatible with the later version of the communication standard, and the intended carrier is selected to be compatible with the user equipment executing the method.

3. The method according to claim 1, wherein the intended carrier is selected based on at least one of a relative position and an order of at least two of the detected individual carriers which conform to a predefined relationship between individual carriers of the multi-carrier structure.

4. The method according to claim 1, wherein each of the received synchronization channels for the detected individual carriers that are compatible with the later version of a communication standard comprises a layer one cell-carrier identifier, which is used to select the intended carrier.

5. The method according to claim 1, wherein there is a predefined division of addressing space layer one cell-carrier identifier in the received synchronization channels of detected individual carriers that are compatible with both the earlier version and the later version of a communication standard, and the predefined division of the addressing space is used to select the intended carrier.

6. The method according to claim 1, in which each of the received broadcast channels of detected individual carriers comprises at least one of an explicit and an implicit advertisement element indicating whether the respective carrier is compatible with either the earlier version or the later version of a communication standard, and the advertisement is used to select the intended carrier.

7. The method according to claim 1, in which the received synchronization channels or broadcast channels of detected individual carriers that are compatible with the later version of a communication standard has a different structure than the received synchronization channels of detected individual carriers that are compatible with the earlier version of the communication standard, and the intended carrier is selected based on the different structure.

8. A non-transitory computer-readable medium comprising computer program code embodied therein for execution by a computer, the non-transitory computer-readable medium and the computer being embodied in a user equipment, the computer program code comprising:
   code for determining a multi-carrier structure of a flexible spectrum use wireless cell based on at least one of received synchronization channels and broadcast channels of detected individual carriers of the flexible spectrum use wireless cell, where the multi-carrier structure of the flexible spectrum use wireless cell is characterized by a wide bandwidth spectrum comprised of a plurality of substantially independent individual carriers that are one of contiguous to one another in a channel bonded instance of the wide bandwidth spectrum and at least partially non-contiguous to one another in a channel aggregated instance of the wide bandwidth spectrum; and
   code for using the determined multi-carrier structure to select an intended carrier for initial access or cell reselection to the flexible spectrum use wireless cell, wherein the multi-carrier structure comprises carriers that are compatible with an earlier version of a communication standard, or carriers that are compatible with a later version of the communication standard, or carriers that are compatible with an earlier version of a communication standard and carriers that are compatible with a later version of the communication standard;
   wherein the code for determining comprises code for determining from the received synchronization channels relative positions of the individual carriers in a spectrum band of the multi-carrier structure; and
   layer one cell-carrier identifiers.

9. An apparatus, comprising:
   a user equipment that comprises at least one processor; and
   at least one memory including computer program code,
   the at least one memory and the computer program code configured to, with the at least one processor, cause the apparatus to perform at least the following:
   determine a multi-carrier structure of a flexible spectrum use wireless cell based on received at least one of synchronization channels or broadcast channels of detected individual carriers of the flexible spectrum use wireless cell, where the multi-carrier structure of the flexible spectrum use wireless cell is characterized by a wide bandwidth spectrum comprised of a plurality of substantially independent individual carriers that are one of contiguous to one another in a channel bonded instance of the wide bandwidth spectrum and at least partially non-contiguous to one another in a channel aggregated instance of the wide bandwidth spectrum;

use the determined multi-carrier structure to select an intended carrier; and attempt at least one of initial access and cell reselection to the flexible spectrum use wireless cell on the selected carrier, wherein the multi-carrier structure comprises carriers that are compatible with an earlier version of a communication standard, or carriers that are compatible with a later version of the communication standard, or carriers that are compatible with an earlier version of a communication standard and carriers that are compatible with a later version of the conmuinication standard;

wherein the at least one memory and the computer program code further configured to, with the at least one processor, cause the apparatus to perform at least the following:

determine the multi-carrier structure by determining from the received synchronization channels relative positions of the individual carriers in a spectrum band of the multi-carrier structure; and layer one cell-carrier identifiers.

10. The apparatus according to claim 9, wherein the multi-carrier structure comprises a predefined placement of individual carriers compatible with the earlier version of a communication standard relative to individual carriers compatible with the later version of the communication standard, and the processor selects the intended carrier to be compatible with the apparatus.

11. The apparatus according to claim 9, wherein the at least one memory and the computer program code further configured to, with the at least one processor, cause the apparatus to perform at least the following:

select the intended carrier based on at least one of a relative position and an order of at least two of the detected individual carriers which conform to a predefined relationship between individual carriers of the multi-carrier structure.

12. The apparatus according to claim 9, wherein the at least one memory and the computer program code further configured to, with the at least one processor, cause the apparatus to perform at least the following:

each of the received synchronization channels for the detected individual carriers that are compatible with the later version of a communication standard comprises a layer one cell-carrier identifier; and use the layer one cell-carrier identifier to select the intended carrier.

13. The apparatus according to claim 9, wherein the at least one memory and the computer program code further configured to, with the at least one processor, cause the apparatus to perform at least the following:

there is a predefined division of addressing space layer one cell-carrier identifier in the received synchronization channels of detected individual carriers that are compatible with both the earlier version and the later version of a communication standard, and the predefined division of the addressing space is used to select the intended carrier.

14. The apparatus according to claim 9, wherein the at least one memory and the computer program code further configured to, with the at least one processor, cause the apparatus to perform at least the following:

each of the received at least one of synchronization channels and broadcast channels of detected individual carriers comprises at least one of an explicit and an implicit advertisement element indicating whether the respective carrier is compatible with one of the earlier version and the later version of a communication standard; and use the advertisement to select the intended carrier.

15. The apparatus according to claim 9, wherein the at least one memory and the computer program code further configured to, with the at least one processor, cause the apparatus to perform at least the following:

the received at least one of synchronization channels and broadcast channels of detected individual carriers that are compatible with the later version of a communication standard has a different structure than the received synchronization channels of detected individual carriers that are compatible with the earlier version of the communication standard; and use the different structure to select the intended carrier.

* * * * *

UNITED STATES PATENT AND TRADEMARK OFFICE
CERTIFICATE OF CORRECTION

PATENT NO. : 9,491,689 B2
APPLICATION NO. : 12/996375
DATED : November 8, 2016
INVENTOR(S) : Koivisto et al.

It is certified that error appears in the above-identified patent and that said Letters Patent is hereby corrected as shown below:

In the Claims

Claim 8, Column 12, Line 30 "ofa" should be deleted and --of a-- should be inserted.

Claim 8, Column 12, Line 33 "ofdetected" should be deleted and --of detected-- should be inserted.

Claim 8, Column 12, Line 36 "ofa" should be deleted and --of a-- should be inserted.

Claim 9, Column 13, Line 4 "ofa" should be deleted and --of a-- should be inserted.

Claim 9, Column 13, Line 22 "conmuinication" should be deleted and --communication-- should be inserted.

Claim 11, Column 13, Line 45 "predefified" should be deleted and --predefined-- should be inserted.

Claim 14, Column 14, Line 30 "ofthe" should be deleted and --of the-- should be inserted.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*